United States Patent Office.

I. W. SPEYER, OF HAMBURG, GERMANY.

Letters Patent No. 99,255, dated January 25, 1870.

IMPROVEMENT IN FERTILIZERS.

The Schedule referred to in these Letters Patent and making part of the same.

*To all whom it may concern:*

Be it known that I, I. W. SPEYER, of Hamburg, Germany, have invented a new and improved Compound for Manure; and I do hereby declare the following to be a full, clear, and exact description thereof, which will enable those skilled in the art to make and use the same.

This invention relates to a compound, which is obtained with the best advantage by subjecting the earths and minerals obtained from the mines in Stassfurt, in the Kingdom of Prussia, to a washing and separating-process. These earths and minerals are chiefly composed of sulphates and muriates of potash and magnesia; and, in order to obtain my manuring-compound, I first grind or pulverize said minerals in suitable mills, and then I dissolve the mass in water, the temperature of which is raised to and kept at the boiling-point for a sufficient length of time to effect the desired solution. If this solution is left to stand, I obtain crystals, which are chiefly composed of chloride of potassium, or muriate of potash and sulphate of potash; and this compound I have found to possess manuring-qualities in a very high degree, and I have applied my manuring-compound to crops of tobacco and sugar-cane with very good effect.

The compound which I have used with the best effect contains about two parts of muriate of potash to one part of sulphate of potash; but it is obvious that the proportion must be changed to suit the ground in which, and the crop for which it is to be used, since the object of the manure is to restore to the ground such mineral elements as are taken away by the crop which has been grown and removed from the ground.

What I claim as new, and desire to secure by Letters Patent, is—

1. A manuring-compound, substantially as described.

2. The within-described process for producing a manuring-compound, substantially such as specified, by treating the minerals obtained from the mines of Stassfurt, in the manner set forth.

This specification signed by me, this 29th day of November, 1869.

I. W. SPEYER.

Witnesses:
W. HAUFF,
E. F. KASTENHUBER.